Figure 1:
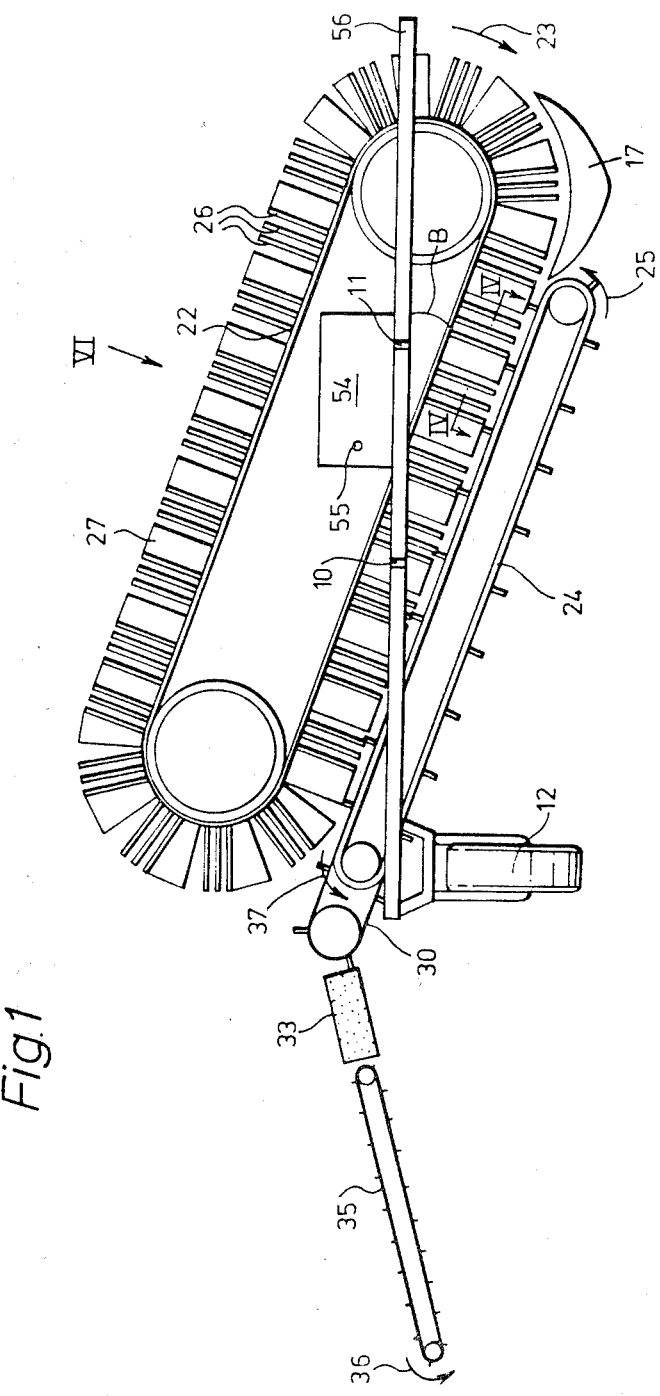

United States Patent [19]

Small et al.

[11] 4,407,370
[45] Oct. 4, 1983

[54] SEPARATOR DEVICE

[75] Inventors: Peter S. Small; Peter W. Small, both of Forfar, Scotland

[73] Assignee: Tonparo Limited, Edinburgh, Scotland

[21] Appl. No.: 240,986

[22] Filed: Mar. 5, 1981

Related U.S. Application Data

[63] Continuation of Ser. No. 939,113, Sep. 5, 1978, Pat. No. 4,284,145.

[30] Foreign Application Priority Data

Sep. 10, 1977 [GB] United Kingdom ............... 37835/77

[51] Int. Cl.$^3$ ............................................ A01D 33/02
[52] U.S. Cl. .................................... 171/124; 209/692; 209/693
[58] Field of Search ................... 171/124, 126, 18, 40; 209/691-694, 651, 617

[56] References Cited

U.S. PATENT DOCUMENTS

| | | | |
|---|---|---|---|
| 798,385 | 8/1905 | Ayres | 209/692 |
| 956,821 | 5/1910 | Nix | 171/124 |
| 2,698,506 | 1/1955 | Rushfeldt | 209/693 |
| 3,455,447 | 7/1969 | Bucher | 209/692 |

*Primary Examiner*—Jay N. Eskovitz
*Attorney, Agent, or Firm*—Spencer, Kaye & Frank

[57] ABSTRACT

A harvesting device for separating round root crops, such as potatoes, from soil and other unwanted material. The crop and the soil in which it is growing is uplifted into the harvesting device by the forward movement of the device. The uplifted material is delivered into two conveyors, one positioned above the other and one running at a different speed from the other. The upper conveyor has a series of transverse members, such as fingers and flaps, which break up the uplifted material into discrete portions and these transverse members form with the lower conveyor a series of pockets so that each discrete portion of uplifted material lies in a pocket. The conveyors are inclined and this combined with the differential speed causes the material to be tumbled and the round root crops to roll free of unwanted material.

3 Claims, 13 Drawing Figures

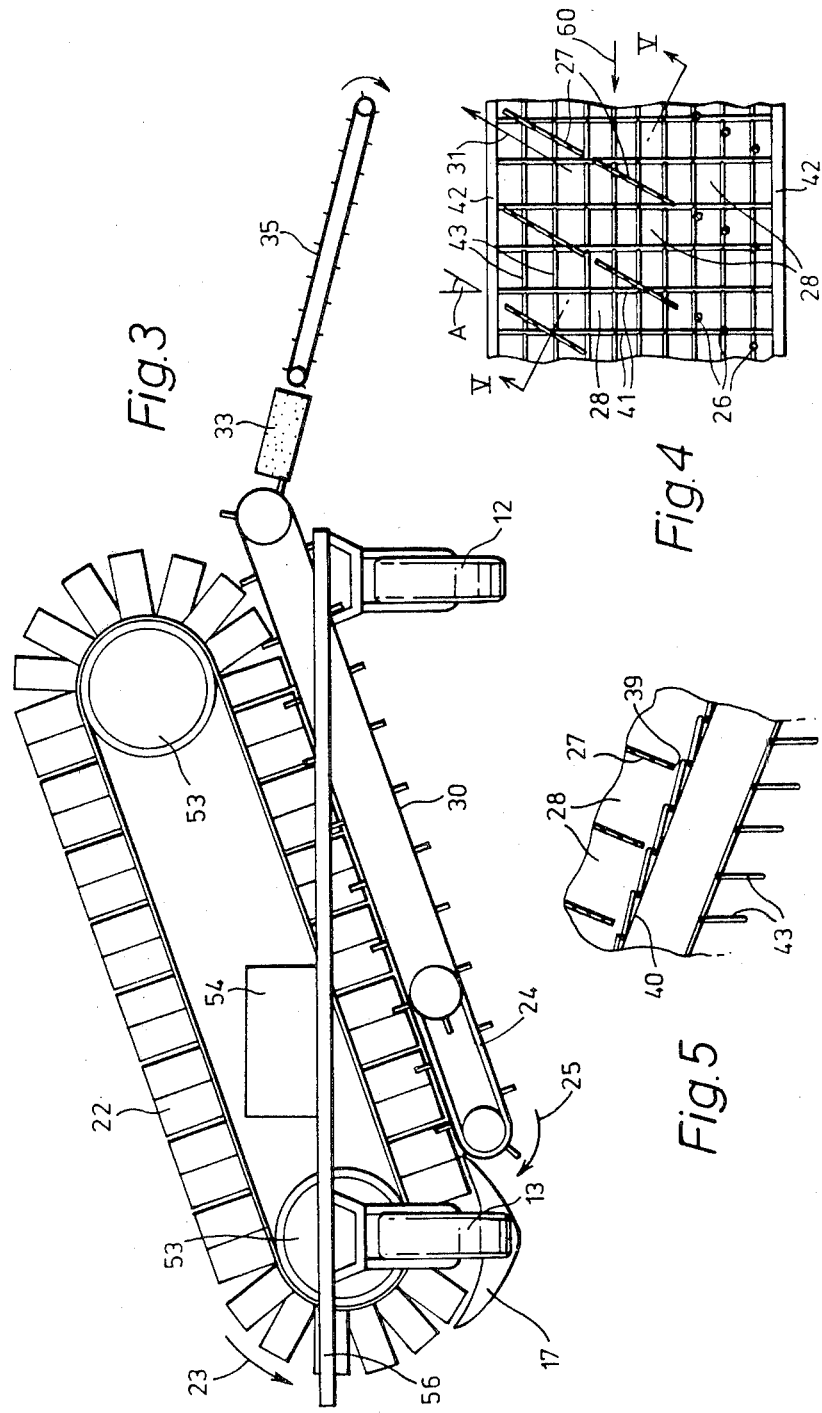

SEPARATOR DEVICE

This is a continuation of application Ser. No. 939,113, filed Sept. 5, 1978, now U.S. Pat. No. 4,284,145.

This invention relates to a device for separating round root crops from soil and other unwanted material which may be picked up in the course of harvesting the root crops. One particular application of the invention relates to the harvesting of potatoes and another concerns the grading of root crops after harvesting.

Potato harvesters have developed only slowly over the years; the first mechanical harvester was referred to as a "spinner-digger" and comprised a circular frame having a series of fingers arranged around its periphery. As the spinner-digger advanced across a potato field the frame rotated and the fingers dug into the ridge and threw the contents of the ridge to one side spreading the contents on the ground and thus allowing the potatoes to be picked up by hand by farm workers following along behind. The spinner-digger provided quite good separation with fairly low mechanical damage to the potatoes but the amount of manual effort required to collect up the potatoes was quite large.

Potato harvesters have since been developed which lift the whole contents of the ridge and pass them on to some form of conveyor. The conveyor attempts to separate the earth by a riddling action and in the early form of harvesters, apart from this riddling action, the remaining earth, stones, haulms and other material were then deposited on a moving picking table for the potatoes to be hand picked by a number of farm workers carried on the harvester.

Potato harvesters have lately been developed which pass the material through a sorting device in which stones are identified by either an X-ray or gamma-ray source and mechanical fingers are then automatically operated to divert the stones away from the potatoes. These harvesters all include long conveyor runs in which the conveyors comprise transverse round metal bars. Some of the conveyors include eccentric wheels to accentuate the riddling action and thus result in the potatoes, stones and earth clods being thrown violently about with consequential bruising and puncturing of the skin of the potatoes. This kind of damage can cause rot when the potatoes are subsequently stored. The degree of damage and therefore the likelihood of rot can be assessed by visual examination of a harvested crop and a count made of the proportion of potatoes which have been damaged in some way, the count then being expressed as a percentage of undamaged to damaged potatoes. Even in the best of conditions, the damage with present harvesters is still very high and about 60% undamaged crop is in practice a good figure to achieve.

In some conditions of soil the technique is used in which a harvester is used to lift the crop and all the unwanted material and to separate only some of the soil. The crop and the remaining unwanted material is transported to a shed where it is passed through a stationary separator and the unwanted material is then taken back to the field. For every ton of potatoes this can involve carrying four tons of unwanted material from the field to the separator and back.

A series of harvesters has been developed which rely entirely on a riddling action for separation. They were originally used on stone-free soil such as exists in the reclaimed lands of Holland. When used in stony soils these harvesters were unable to separate the stones from the potatoes and the transport of the potatoes with the stones through the harvester caused considerable damage to the potatoes. As a result stone separation techniques have been used in which a stone separator machine is used on the soil before the potatoes are planted, the separator causing a majority of stones to be deposited in rows between which the potatoes are planted and their ridges built up. This arrangement is not entirely satisfactory and can cause difficulty during harvesting because tractors tend to lose traction and slew about sometimes, causing the rows of stones to be harvested instead of the ridges of potatoes.

In all of these harvesters separation of potatoes from the other material is not very effective and damage to the potatoes is high mainly because the riddling action causes the potatoes to be bounced up and down with the stones and earth clods; the present invention aims to provide an improvement in separation combined with a very short transport distance through the harvester resulting in low damage to the potatoes. The separation device of the invention is also capable of use in separation which is carried out away from the field.

According to the invention there is provided a device for separating round root crops from soil and other unwanted material, the device comprising first and second endless conveyors each having an endless conveyor element arranged with upper and lower runs, the first conveyor element carrying a series of harvesting members spaced apart along its length, the second conveyor element having its upper run contiguous to the harvesting members of the lower run of the first conveyor element so as to define with said members a series of spaced harvesting pockets, the conveyors being arranged so that the harvesting pockets are inclined transversely across the width of the conveyor element so as to encourage round objects to roll across said width, means for delivering the crop, the soil and other unwanted material in discrete portions into said pockets and means for driving the conveyor elements so that one conveyor element travels at a higher linear speed than the other conveyor element.

Figure 2:
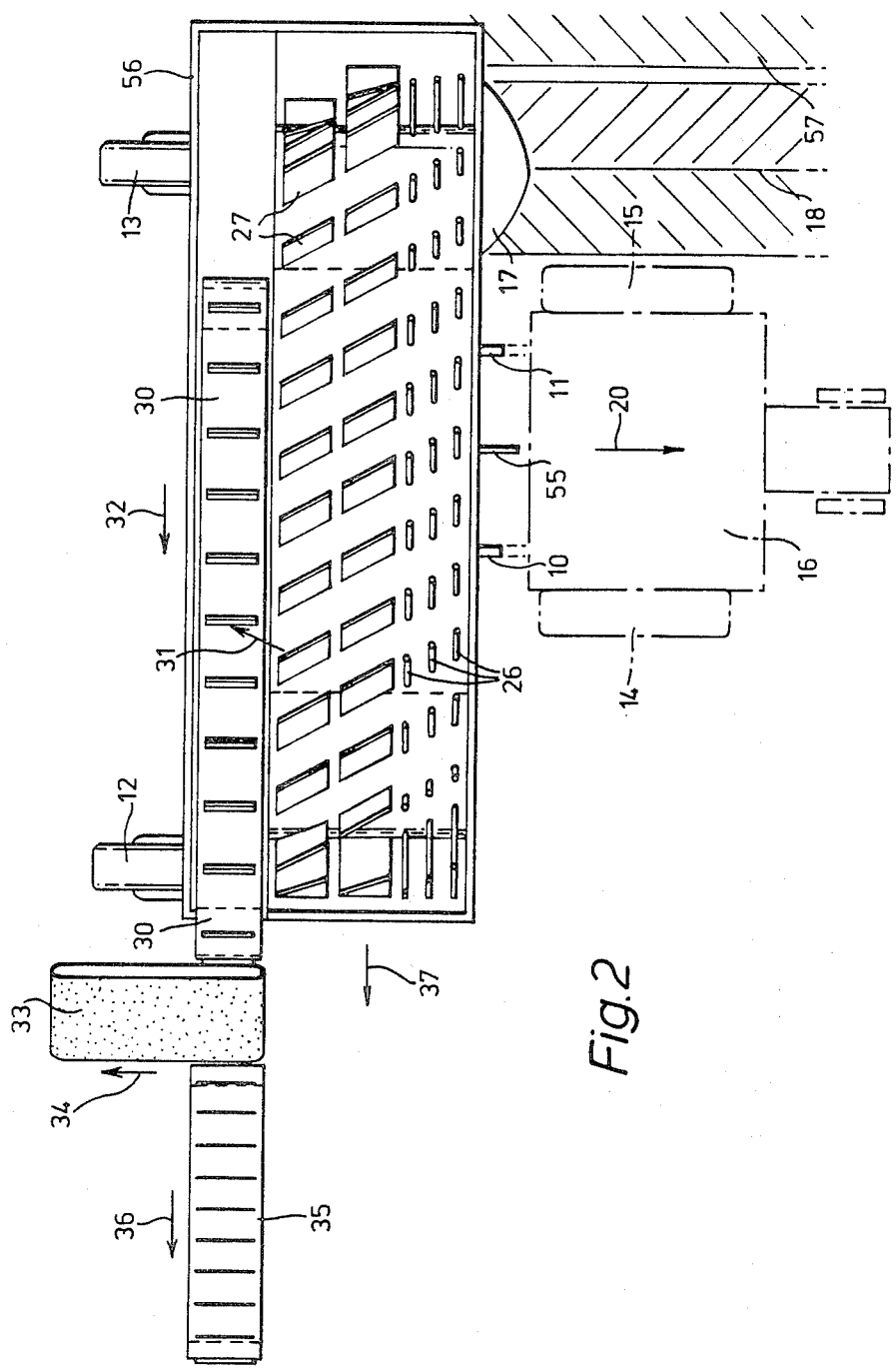
Figure 6:
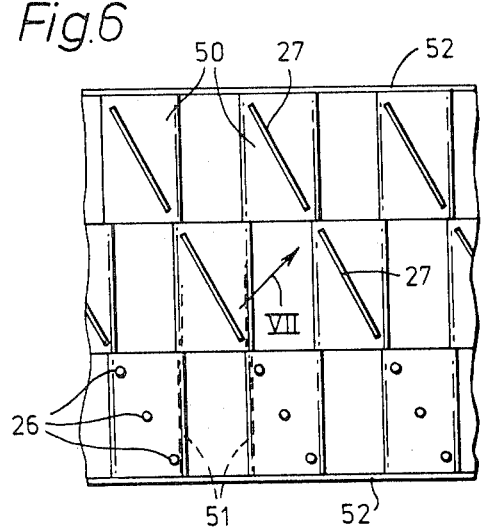
Figure 7:
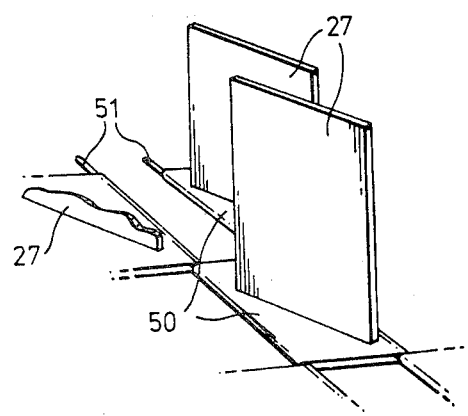
Figures 8, 9, 10:
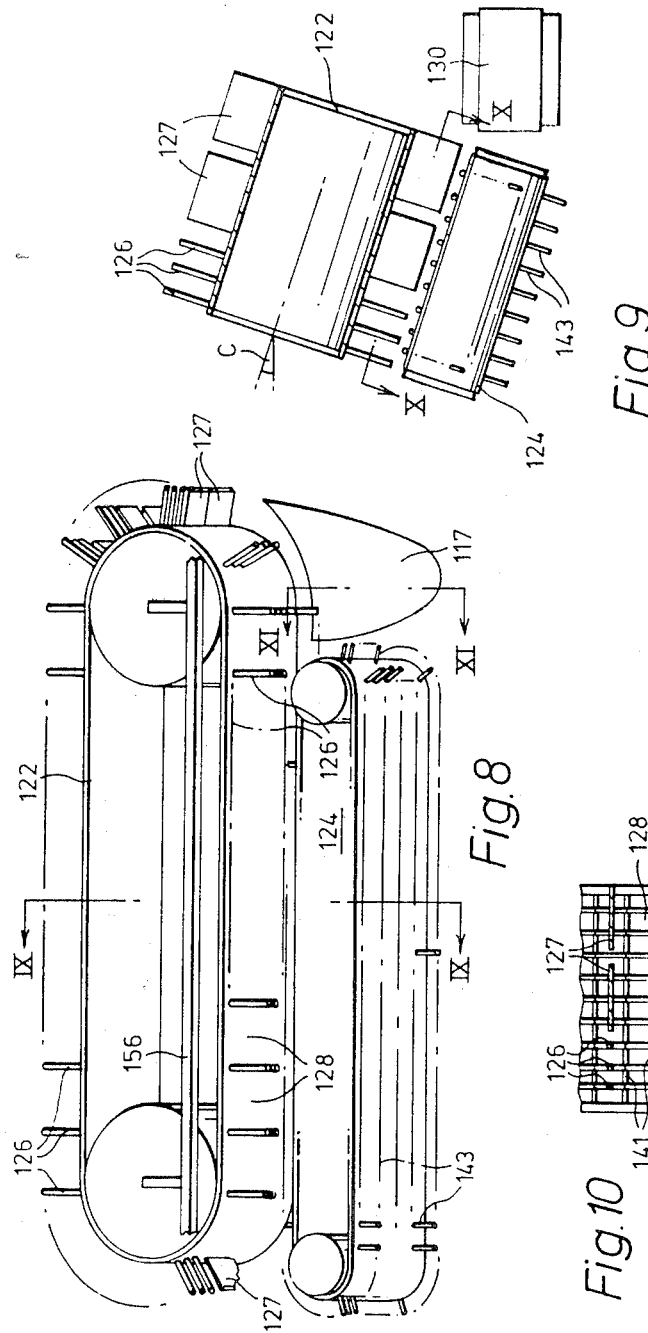
Figure 12:
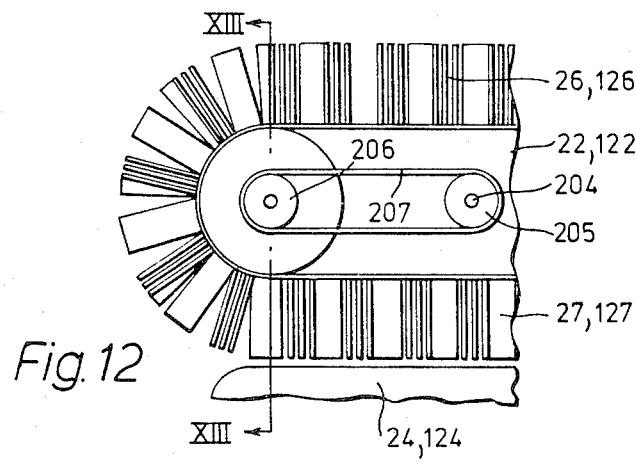
Figure 13:
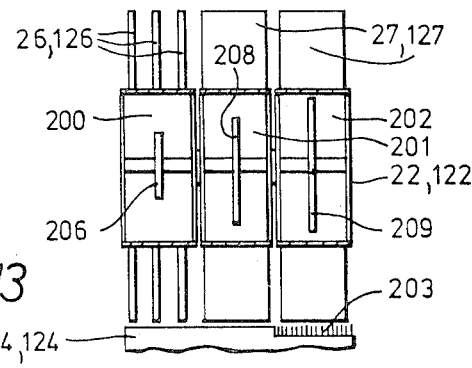
Figure 11:
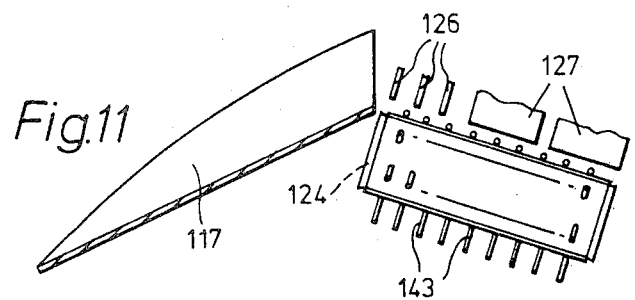

Embodiments of the invention will now be described with reference to the accompanying drawings in which:

FIG. 1 is a front elevation of a potato harvester including a separation device constructed in accordance with the present invention, FIG. 2 is a plan view of the harvester of FIG. 1, FIG. 3 is a rear view of the harvester of FIG. 1, FIG. 4 is a sectional part plan taken along the line IV—IV shown in FIG. 1 and to a larger scale, FIG. 5 is a part vertical section taken along the line V—V of FIG. 4, FIG. 6 is a fragmentary plan view taken in the direction of arrow VI of FIG. 1, FIG. 7 is a fragmentary perspective view taken in the direction of arrow VII of FIG. 6, FIG. 8 is a front elevation of an alternative embodiment of the potato harvester, FIG. 9 is a vertical section along the line IX—IX of FIG. 8 and to a larger scale, FIG. 10 is a sectional plan along the line X—X of FIG. 9, FIG. 11 is a vertical part-section taken along the line XI—XI of FIG. 8 but to the same scale as FIGS. 9 and 10, FIG. 12 is a part front view of the upper conveyor of the harvester incorporating a modified drive arrangement, and, FIG. 13 is a section taken along the line XIII—XIII of FIG. 12.

The potato harvester shown in FIGS. 1 to 7 of the drawings is intended to be connected to a tractor through two mounting lugs 10, 11. In the modern tractor the complementary mountings can be raised and lowered and the harvester when connected to the tractor can be made to run on its own two rear wheels 12, 13 with the rest of its weight carried by the tractor.

In the course of harvesting, the harvester is brought by the tractor into a potato field and the tractor positioned with its wheels 14, 15 as shown (see FIG. 2 in which the remainder of the tractor is shown only in outline at 16) so that the harvester is positioned with its digging share 17 aligned with a potato ridge 18. The tractor advances in the direction of arrow 20, having first lowered the front end of the harvester so that the share 17 is at a digging height at which it will engage the whole contents of the ridge 18.

In operation a first conveyor 22 is driven to move in the direction of arrow 23 (FIGS. 1 and 3) and a second conveyor 24 is driven to move in the direction of arrow 25 (FIGS. 1 and 3). The conveyor has a series of spaced harvesting members which include harvesting elements comprising sets of fingers 26 and plates 27. As the conveyor 22 goes round and the potato harvester advances across the field, the material of the ridge 18 is forced up the share to be engaged by the fingers 26 as they pass over the share from right to left as seen in FIG. 1. Each set of these fingers takes a swathe out of the ridge material being forced up the share and carries it to the left and upwards as seen in FIG. 1, the conveyors 22, 24 being inclined at angle B to the horizontal. The harvesting members 26, 27 and the second conveyor between them define a series of harvesting pockets 28, each one of which receives one swathe of the material harvested from the ridge 18.

Separation of potatoes and other round objects, such as round stones, from the rest of the material then takes place between the two conveyors 22, 24 in a manner which will be explained later in more detail. This causes potatoes and other round objects to be delivered onto an intermediate conveyor 30 (FIG. 2) in the direction of arrow 31; conveyor 30 transports them in the direction of arrow 32 to a hedgehog conveyor 33 which separates the stones and other round objects from the potatoes. The stones and other round objects are taken in the direction of arrow 34 to be dropped onto the ground and the potatoes pass on to a delivery conveyor 35 and are delivered into a suitable receptacle (not shown) in the direction of arrow 36. Meanwhile the earth, roots, haulms and other unwanted material (from which the potatoes and other round objects have already been removed) remains in the harvesting pockets 28 and are returned to the ground over the end of the conveyor 24 as shown by arrow 37.

Referring now more particularly to FIGS. 4 and 5 there is seen the detail of the harvesting members 26, 27 of the lower run of the first conveyor 22 and their relation to the upper run 40 of the second conveyor 24 to define the harvesting pockets 28. Each harvesting member of conveyor 22 comprises a set of three fingers 26 and two plates 27 arranged in a row across the conveyor (see FIG. 4) and inclined at an angle A to the normal to the longitudinal direction of the conveyor movement. Each harvesting pocket 28 is defined by two adjacent harvesting members 26, 27 and the portion of the run 40 of conveyor 24 lying at any particular time just beneath these two adjacent harvesting members, that is to say the pocket is defined by the rear of one set of fingers 26 and the two aligned plates 27 and by the front of the next behind set of fingers 26 and two plates 27 taken in the direction of conveyor travel: as explained below, conveyor 24 travels at a higher linear speed than conveyor 22 so the portion of conveyor 24 defining any one pocket 28 is always changing because of the relative speed. Each pocket 28 therefore extends across the full width of the two conveyors and because of the inclination angle B of the conveyors and the inclination angle A of the disposition of fingers 26 and plates 27 of the harvesting members, each pocket is inclined across and to the rear of the conveyors thus encouraging round objects such as potatoes when freed from their surrounding earth, to roll off the conveyors in the direction of arrow 31.

In operation both conveyors move in the longitudinal direction indicated by arrow 60, that is to say the lower run of conveyor 22 and the upper run of conveyor 24 both move in this direction, but conveyor 24 moves at a higher linear speed than conveyor 22. Thus as each harvesting member passes the lowest point of conveyor 22 adjacent the share 17 and its set of fingers 26 takes a swathe out of the material being forced up the share by the forward movement of the harvester, this swathe of material is carried to the left and upwards (as seen in FIG. 1) until it lies on the upper run 40 of conveyor 24 in a harvesting pocket 28 as described above. Because conveyor 24 is moving at a higher speed than conveyor 22 the material in a pocket is carried on conveyor 24 until it is brought into contact with the rear side of the harvesting member next in front of the one which harvested it. The material is caused to tumble over backwards by the movement of conveyor 24 relative to the harvesting member of conveyor 22 against which it is being forced. This action tends to break up the harvested material to allow round objects such as potatoes, round stones and clods of earth to roll down conveyor 22 back against the harvesting member which harvested them. The combination of the inclination of angle A of the harvesting members with the inclination of angle B of the two conveyors to the horizontal causes these round objects to travel across the conveyors in the direction of arrow 31 until they pass off conveyors 22 and 24 and are collected on intermediate conveyor 30. Flat stones and other non-round objects are retained on the lower conveyor 24 tending to slide on its surface all the while being pushed against the reverse side of the harvesting member of conveyor 22.

There is a slight gap 39 between the lower edge of fingers 26 and flaps 27 and the upper surface of conveyor 24 and the haulms of the potatoes tend to be drawn through this gap by the relative speed between the conveyors and this causes a stripping action to separate the potatoes from the haulms thus also freeing potatoes to roll backwards down conveyor 24. The tumbling action also causes earth to be broken up and this falls between the runs of conveyor 24 back onto the ground.

The conveyor 24 comprises transverse bars 41, each secured between two belts 42 which are the driven belts of the conveyor. Each bar 41 has a series of fingers 43 extending rearwardly from it to overlie the bar 41 next behind it in the direction of travel, these fingers being freely pivoted so that on the lower, return run of the conveyor the fingers can hang downwards (see FIG. 5) so as to increase the cross-sectional area through which the earth can fall. The haulms, flat stones and other material which does not either roll backwards down the conveyor or fall through it, is all retained on the conveyor 24 and returned to the ground as at arrow 37.

Referring now to FIGS. 6 and 7, it can be seen that the three constituent elements (fingers 26 and the plates 27) of a harvesting member are each mounted on a separate member 50 and these members have their leading and trailing edges turned over so that they are retained on transverse bars 51, each of which is secured to a chain 52. Chains 52 pass over end sprockets 53 by which the conveyor is driven.

It will be noted that the inclination of the harvesting members shown in FIG. 4 is from top right to bottom left but as shown in FIG. 6 is from top left to bottom right. This is because FIG. 4 illustrates the lower run of conveyor 22 whereas FIG. 6 illustrates the upper run.

All the conveyors of the harvester are driven by hydraulic motors operated from a hydraulic assembly 54 which includes a reservoir and a hydraulic pump driven from a power take-off of the tractor through a shaft 55. None of the hydraulic motors has been shown. Also omitted from the drawings are the structural members for supporting the conveyors other than the rectangular main frame 56 of the harvester to which the lugs 10, 11 and the wheels 12, 13 are mounted. Conveyors 30 and 35 are flat belt conveyors with discrete transverse upstands. However conveyor 33 is of the type normally referred to as a "hedgehog" conveyor and this comprises separate thin rubber fingers closely spaced and extending outwardly from the conveyor belt. These rubber fingers have the characteristic that objects of fairly low density such as potatoes will merely roll across them but objects of high density such as clods of earth and stones will cause the fingers to collapse and these objects will therefore be carried along by the conveyor. As seen in FIGS. 1 to 3, conveyor 33 is tilted so as to allow potatoes to roll across it from conveyor 30 to conveyor 35 whilst stones and clods of earth are retained on it to be carried in the direction of arrow 34.

Referring back to FIG. 2, the harvester is shown dealing with a potato ridge 18. When the tractor and harvester reach the end of this ridge they will turn, traverse the end of the field and deal with the next unharvested ridge at the other end of the field; having dealt with that ridge they will re-cross the field and deal with ridge 57 adjacent to ridge 18 so that the orientation of the harvester to the ridge being harvested is always the same and the tractor and harvester wheels are always running on harvested ground.

Wheels 12, 13 are capable of being turned through 90° to enable the harvester to travel between fields and for this purpose additional wheels (not shown) can be fitted at the other two corners of frame 56. Conveyors 33 and 35 can be swung upwards and the harvester towed sideways to facilitate passage along lanes and through field gates.

Referring now to FIGS. 8 to 11, there is shown a modification to the harvester of FIGS. 1 to 7 in which the two main conveyors 122 and 124 travel horizontally, as seen in the front view of FIG. 8, but are inclined through angle C (FIG. 9) from front to back. The conveyor 122 comprises harvesting members made up of sets of three fingers 126 and two plates 127 which are aligned across the conveyor normal to the direction of conveyor movement and not skewed as in the earlier embodiment. Harvesting pockets 128 are therefore still inclined across the conveyor so as to encourage round objects such as potatoes to roll across the conveyor from left to right as seen in FIG. 9 onto delivery conveyor 130.

The lower conveyor 124 again comprises transverse metal bars 141 secured to flexible belts 142 and having freely pivoted fingers 143. As seen in FIG. 10, the harvesting members comprising fingers 126 and plates 127, extend parallel to bars 141.

Because of the inclination of the two conveyors from front to back, a modified harvester share 117 is provided and this has to carry the material dug out of the ridge up to the fingers 126 of conveyor 122.

In the two embodiments shown the angles A, B and C can be between 150° and 45° depending on the soil conditions and there may be provided adjustments for varying these angles.

In a modification shown in FIGS. 12 and 13, the upper conveyor, which may be conveyor 22 or conveyor 122, is split into three parts, a first part 200 carrying the fingers 26, 126 and two other parts 201, 202 each carrying a row of flaps 27, 127. In this arrangement means is provided to drive each of the parts of conveyor 22, 122 at a different speed.

The part 200 of conveyor 22, 122 which carries the fingers 26, 126 is driven at the fastest speed to enable the harvester to provide rapid harvesting of the crop and the part 202 carrying the rear row of flaps 27, 127 goes at the slowest speed whilst beneath it the conveyor 24, 124 comprises a "hedgehog" conveyor at 203. In this way the fingers 26, 126 deal rapidly with the harvested material, separation of round objects from the remainder is provided in the middle part 201 of the conveyor and the rear part 202 co-operates with the "hedgehog" conveyor to provide separation of round stones and clods of earth from the potatoes. In this arrangement it is arranged that the linear speed of conveyor 24, 124 is higher than the highest speed of conveyor 22, 122.

The means for driving conveyor parts 200, 201, 202 at different speeds comprise an hydraulic motor (not shown) driving a shaft 204 which extends across the full width of the conveyor and carries three sprockets, one of which is shown at 205. Sprocket 205 drives sprocket 206 on conveyor part 200 through chain 207. The other two sprockets on shaft 204 respectively drive sprockets 208 on conveyor part 201 and sprocket 209 on conveyor part 202. It can be seen from FIG. 13 that sprockets 206, 208, 209 are of different sizes and these sizes are chosen together with the sizes of the co-operating sprockets on shaft 204 to give the speed differences described above.

When used as a stationary separator the harvesting members may consist entirely of one or more plates and the lower conveyor may comprise an open lattice-work of a pre-determined size so as to effect a coarse grading of the crops by size.

We claim:

1. A separator for separating round root crops from soil and other unwanted material comprising:
   a first endless conveyer element having upper and lower runs extending in a longitudinal direction;
   a plurality of spaced harvesting members, each comprising at least two elements one of which is a flat plate, secured to said first conveyer element, said harvesting members being arranged on said first conveyer element in a line extending normal to said longitudinal direction, said elements being arranged around said conveyer in rows;
   a second endless conveyer element having upper and lower runs, the upper run of said second conveyer element being adjacent to the harvesting members secured to said first conveyer element, the upper run of said second endless conveyer and said harvesting members forming harvesting pockets therebetween, said first and second endless conveyer elements being inclined with respect to the horizontal in a direction transverse to said longitudinal direction;

means for delivering said crop, soil and unwanted material in discrete portions into said harvesting pockets;

means for driving one of said first and second conveyer elements at a higher speed than the other; and means for driving one row of elements on said harvesting member at a different speed from the speed of another row, round objects comprising part of said crops, soil unwanted material rolling in the direction of incline of said harvesting member out of said harvesting pockets thereby separating said round objects from the rest of said crops, soil and unwanted material.

2. A separator according to claim 1 wherein said second conveyer element comprises an open lattice framework to allow earth to pass freely therethrough.

3. A separator according to claim 1 wherein one of said elements comprises a plurality of cylindrical fingers extending outwardly from said first conveyer element and arranged to engage the material of a root crop ridge lifted from the ground, said separator taking a swathe out of said ridge material and delivering said swathe of material to a harvesting pocket.

* * * * *